(12) United States Patent
Boyer et al.

(10) Patent No.: US 11,181,646 B2
(45) Date of Patent: *Nov. 23, 2021

(54) SYSTEMS AND METHODS FOR PROVIDING ANTI-SPOOFING CAPABILITY TO A GLOBAL NAVIGATION SATELLITE SYSTEM RECEIVER

(71) Applicant: Interstate Electronics Corporation, Anaheim, CA (US)

(72) Inventors: Derek Michael Loomer Boyer, Corona, CA (US); Steven B. Alexander, Orange, CA (US); Richard F. Redhead, Mission Viejo, CA (US)

(73) Assignee: Interstate Electronics Corporation, Anaheim, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/902,858

(22) Filed: Jun. 16, 2020

(65) Prior Publication Data

US 2020/0309958 A1    Oct. 1, 2020

Related U.S. Application Data

(63) Continuation of application No. 15/861,961, filed on Jan. 4, 2018, now Pat. No. 10,725,182.

(51) Int. Cl.
   *G01S 19/21*    (2010.01)
   *G01S 19/36*    (2010.01)
   (Continued)

(52) U.S. Cl.
   CPC .......... *G01S 19/215* (2013.01); *G01S 19/03* (2013.01); *G01S 19/36* (2013.01); *G01S 19/24* (2013.01)

(58) Field of Classification Search
   CPC ...... G01S 19/215; G01S 5/0215; G01S 19/24; G01S 1/24; G01S 19/37; G01S 19/36;
   (Continued)

(56) References Cited

U.S. PATENT DOCUMENTS

| | | | |
|---|---|---|---|
| 4,622,557 A | 11/1986 | Westerfield |
| 5,021,792 A | 6/1991 | Hwang |

(Continued)

FOREIGN PATENT DOCUMENTS

GB    2353648    2/2001

OTHER PUBLICATIONS

Chen, et al., "Off-the-Shelf Antennas for Controlled-Reception-Pattern Antenna Arrays"; GPS World; Innovation: Getting Control; Feb. 1, 2013, [retrieved on Feb. 26, 2014]. Retrieved from the Internet: URL: http://gpsworld.com/innovation-getting-control-off-the-shelf-antennas-for-controlled-reception-pattern-antenna-arrays/.

(Continued)

*Primary Examiner* — Olumide Ajibade Akonai
(74) *Attorney, Agent, or Firm* — Knobbe, Martens, Olson & Bear LLP

(57) ABSTRACT

Apparatus and methods provide anti-spoofing capability from a first global navigation satellite system (GNSS) receiver to a second GNSS receiver. These GNSS receivers can be, for example, global positioning satellite (GPS) receivers. Via an authentication technique, signals from authentic GNSS sources are distinguished from signals from spoofers. Timing information, such as numerically-controlled oscillator (NCO) settings, used for tracking authenticated signals are then used to generate replica GNSS signals, which are then provided to the second GNSS (Continued)

receiver. As a result, the second GNSS receiver can provide accurate positioning system information in the presence of GNSS spoofers.

21 Claims, 11 Drawing Sheets

(51) Int. Cl.
*G01S 19/03* (2010.01)
*G01S 19/24* (2010.01)

(58) Field of Classification Search
CPC .......... G01S 19/03; H04K 3/65; H04K 3/224; H04K 3/228
See application file for complete search history.

(56) References Cited

U.S. PATENT DOCUMENTS

| | | | |
|---|---|---|---|
| 5,119,341 A | 6/1992 | Youngberg | |
| 5,173,700 A | 12/1992 | Chesley | |
| 5,438,337 A | 8/1995 | Aguado | |
| 5,461,387 A | 10/1995 | Weaver | |
| 5,548,293 A | 8/1996 | Cohen | |
| 5,570,097 A | 10/1996 | Aguado | |
| 5,579,021 A | 11/1996 | Lee | |
| 5,596,600 A | 1/1997 | Dimos et al. | |
| 5,617,317 A | 4/1997 | Ignagni | |
| 5,712,641 A | 1/1998 | Casabona et al. | |
| 5,757,316 A | 5/1998 | Buchler | |
| 5,784,028 A | 7/1998 | Corman et al. | |
| 5,786,790 A | 7/1998 | Abbott | |
| 5,786,791 A | 7/1998 | Bruckert | |
| 5,812,086 A | 9/1998 | Bertiger | |
| 5,872,540 A | 2/1999 | Casabona et al. | |
| 5,877,725 A | 3/1999 | Kalafus | |
| 5,940,026 A | 8/1999 | Popeck | |
| 5,952,968 A | 9/1999 | McDowell | |
| 5,955,987 A | 9/1999 | Murphy et al. | |
| 6,018,315 A | 1/2000 | Ence et al. | |
| 6,031,488 A | 2/2000 | Hua et al. | |
| 6,084,540 A | 7/2000 | Yu | |
| 6,166,690 A | 12/2000 | Lin et al. | |
| 6,195,040 B1 | 2/2001 | Arethens | |
| 6,201,497 B1 | 3/2001 | Snyder et al. | |
| 6,266,008 B1 | 7/2001 | Huston et al. | |
| 6,281,841 B1 | 8/2001 | Nevill | |
| 6,339,396 B1 | 1/2002 | Mayersak | |
| 6,392,596 B1 | 5/2002 | Lin et al. | |
| 6,452,543 B1 | 9/2002 | Tseng et al. | |
| 6,466,177 B1 | 10/2002 | Kunysz | |
| 6,531,976 B1 | 3/2003 | Yu | |
| 6,580,389 B2 | 6/2003 | Speyer et al. | |
| 6,598,009 B2 | 7/2003 | Yang | |
| 6,653,973 B2 | 11/2003 | Yu | |
| 6,700,536 B1 | 3/2004 | Wiegand | |
| 6,744,408 B1 | 6/2004 | Stockmaster | |
| 6,784,831 B1 | 8/2004 | Wang et al. | |
| 6,836,645 B2 | 12/2004 | Hilgers et al. | |
| 6,861,983 B2 | 3/2005 | Casabona et al. | |
| 6,952,460 B1 | 10/2005 | Van Wechel et al. | |
| 6,961,017 B1 | 11/2005 | Naylor et al. | |
| 7,010,262 B2 | 3/2006 | Tyson | |
| 7,170,445 B2 | 1/2007 | Thiel et al. | |
| 7,183,971 B1 | 2/2007 | Lloyd et al. | |
| 7,250,903 B1 | 7/2007 | McDowell | |
| 7,340,283 B1 | 3/2008 | Melick | |
| 7,411,550 B2 | 8/2008 | Torimoto et al. | |
| 7,415,354 B2 | 8/2008 | Alexander | |
| 7,460,064 B1 | 12/2008 | Tester et al. | |
| 7,468,695 B1 | 12/2008 | Williams | |
| 7,471,238 B2 | 12/2008 | Lillo | |
| 7,508,339 B1 | 3/2009 | McDowell | |
| 7,577,464 B2 | 8/2009 | Ezal et al. | |
| 7,602,335 B2 | 10/2009 | Pan | |
| 7,605,751 B2 | 10/2009 | Schipper et al. | |
| 7,671,791 B2 | 3/2010 | Feller | |
| 7,764,224 B1 | 7/2010 | Anderson | |
| 7,952,519 B1 | 5/2011 | Nielsen | |
| 7,978,130 B1 | 7/2011 | Cohen et al. | |
| 7,979,203 B2 | 7/2011 | Haag et al. | |
| 8,035,562 B2 | 10/2011 | Chang | |
| 8,044,857 B2 | 10/2011 | Maenpa et al. | |
| 8,154,445 B2 | 4/2012 | Maenpa et al. | |
| 8,305,265 B2 | 11/2012 | Ezal et al. | |
| 8,487,812 B1 | 7/2013 | Stratton | |
| 8,712,051 B2 | 4/2014 | Psiaki | |
| 9,164,176 B2 | 10/2015 | Fenton | |
| 9,383,449 B2 | 7/2016 | Kim et al. | |
| 9,500,483 B1 | 11/2016 | Stockmaster et al. | |
| 9,523,774 B2 | 12/2016 | Davies | |
| 9,581,699 B2 | 2/2017 | Zarowski | |
| 9,716,315 B2 | 7/2017 | Rasheed | |
| 10,024,973 B1 | 7/2018 | Alexander | |
| 10,031,234 B1 | 7/2018 | Alexander | |
| 10,545,246 B1 | 1/2020 | Johnston | |
| 10,725,182 B2 * | 7/2020 | Boyer | G01S 19/03 |
| 2002/0169578 A1 | 11/2002 | Yang | |
| 2003/0048221 A1 | 3/2003 | Tseng et al. | |
| 2003/0232595 A1 | 12/2003 | Baker et al. | |
| 2005/0228841 A1 | 10/2005 | Grobert | |
| 2006/0044204 A1 | 3/2006 | Kruth | |
| 2006/0208946 A1 | 9/2006 | Bailey et al. | |
| 2006/0214845 A1 | 9/2006 | Jendbro et al. | |
| 2007/0262899 A1 | 11/2007 | Walter | |
| 2007/0293150 A1 | 12/2007 | Ezal et al. | |
| 2008/0062039 A1 | 3/2008 | Cohen et al. | |
| 2008/0068260 A1 | 3/2008 | Schipper et al. | |
| 2010/0007555 A1 | 1/2010 | Ezal et al. | |
| 2011/0050489 A1 | 3/2011 | Maenpa | |
| 2011/0050497 A1 | 3/2011 | Maenpa et al. | |
| 2011/0068973 A1 | 3/2011 | Humphreys et al. | |
| 2011/0102259 A1 | 5/2011 | Ledvina et al. | |
| 2011/0109506 A1 | 5/2011 | Humphreys et al. | |
| 2011/0241939 A1 | 10/2011 | Maenpa et al. | |
| 2011/0287779 A1 | 11/2011 | Harper | |
| 2012/0119950 A1 | 5/2012 | Kim | |
| 2012/0121087 A1 | 5/2012 | Psiaki | |
| 2013/0002477 A1 * | 1/2013 | Dehnie | G01S 19/47 342/357.3 |
| 2014/0035783 A1 | 2/2014 | Contarino | |
| 2014/0247186 A1 | 9/2014 | Daneshmand | |
| 2015/0116147 A1 | 4/2015 | Jaeckie | |
| 2015/0168562 A1 | 6/2015 | Nichols | |
| 2015/0234053 A1 | 8/2015 | Psiaki | |
| 2015/0268045 A1 | 9/2015 | Duscha | |
| 2015/0268350 A1 | 9/2015 | Whitehead | |
| 2015/0293234 A1 | 10/2015 | Snyder | |
| 2015/0309181 A1 | 10/2015 | Stahlin et al. | |
| 2016/0252623 A1 | 9/2016 | Richard | |
| 2016/0349379 A1 | 12/2016 | Lacaze et al. | |
| 2017/0102464 A1 | 4/2017 | Davies | |
| 2017/0227650 A1 | 8/2017 | Grobert | |

OTHER PUBLICATIONS

Jackson Labs, "RSR GPS RF=Transcoder / 10-Channel GPS Simulator, 2.3×1.6 inches," [online], Jan. 22, 2017, [retrieved on Jun. 1, 2017], retrieved from <URL: http://www.jackson-labs.com/assets/uploads/main/RSR_Transcoder_specsheet.pdf>.
Office Action dated Aug. 28, 2017, from related U.S. Appl. No. 14/678,755, filed Apr. 3, 2015.
PCT International Search Report and Written Opinion of the International Searching Authority regarding International Application No. PCT/US18/62115, dated Feb. 5, 2019, 19 Pages.
Todd E. Humphreys, et al., "The GPS Assimilator: a Method for Upgrading Existing GPS User Equipment to Improve Accuracy, Robustness, and Resistance to Spoofing," [online], Preprint of the 2010 ION GNSS Conference, Portland, Oregon, Sep. 21-24, 2010, [online], [retrieved on Apr. 26, 2017], retrieved from: <URL: https://radionavlab.ae.utexas.edu/images/stories/files/papers/assimilator_for_distribution.pdf>.

(56) References Cited

OTHER PUBLICATIONS

Todd Humphreys, et al., "Assessing the Civil GPS Spoofing Threat," [online], The University of Texas at Austin Radionavigation Laboratory, Powerpoint presentation, 2009, [retrieved on Apr. 26, 2017], retrieved from <URL: https://radionavlab.ae.utexas.edu/images/stories/files/presentations/assessingSpoofingThreat.pdf>.

Wen, et al., "Countermeasures for GPS Signal Spoofing"; Proceedings of the 18th International Technical Meeting of the Satellite Division of The Institute of Navigation (ION GNSS 2005); Long Beach, CA, Sep. 2005, pp. 1285-1290, [retrieved on Sep. 24, 2013]. Retrieved from the Internet: URL: http://lens.ou.edu/Download/ION/ION%202005%20Wen_Spoof.doc.

* cited by examiner

SYSTEMS AND METHODS FOR PROVIDING ANTI-SPOOFING CAPABILITY TO A GLOBAL NAVIGATION SATELLITE SYSTEM RECEIVER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

CROSS-REFERENCE TO RELATED APPLICATION

This application is related to issued and co-owned application titled GLOBAL NAVIGATION SATELLITE SYSTEM SPOOFER IDENTIFICATION TECHNIQUE, U.S. Pat. No. 10,024,973, issued on Jul. 17, 2018, Ser. No. 14/678,755, filed on Apr. 3, 2015, the disclosure of which is hereby incorporated by reference in its entirety herein.

BACKGROUND

Field of the Invention

The invention generally relates to electronics, and in particular, to global navigation satellite system (GNSS) receivers.

Description of the Related Art

The global positioning system (GPS) is an example of a global navigation satellite system (GNSS). A potential threat to the performance of a GNSS receiver is known as "spoofing." Spoofing includes the transmission of false GNSS signals that can trick a GNSS receiver into incorrectly estimating its position, velocity, and/or time. One form of spoofing is known as "meaconing," in which real GNSS signals are rebroadcast in a manner that causes the GNSS receiver to incorrectly estimate position, velocity, and/or time.

In addition, in certain situations, it can be difficult to upgrade or replace an existing GNSS receiver. For example, some GNSS receivers are custom-made or are built into objects such as vehicles. It would be desirable to provide a countermeasure to render these and other GNSS receivers to be less vulnerable to spoofing attacks.

SUMMARY

One embodiment includes an apparatus including a first global navigation satellite system (GNSS) receiver for providing anti-spoofing capability to a second GNSS receiver, wherein the apparatus includes: a first group of acquisition and tracking functions configured to acquire and track multiple downconverted signals, wherein an acquisition and tracking function includes a hardware correlator; a processor configured to determine which of the multiple downconverted signals are based on authentic GNSS signals and which of the multiple downconverted signals are based on spoofed GNSS signals; and GNSS signal replicators configured to generate replicas of authentic GNSS signals based on timing settings used by the first group of acquisition and tracking functions to track the multiple downconverted signals that are based on authentic GNSS signals and not on timing settings used to track the multiple downconverted signals that are based on spoofed GNSS signals.

One embodiment includes a method for providing anti-spoofing capability from a first global navigation satellite system (GNSS) receiver a second GNSS receiver, wherein the method includes: acquiring and tracking multiple downconverted signals using a first group of acquisition and tracking functions, wherein an acquisition and tracking function includes a hardware correlator; determining which of the multiple downconverted signals are based on authentic GNSS signals and which of the multiple downconverted signals are based on spoofed GNSS signals; and using GNSS signal replicators, generating replicas of authentic GNSS signals based on timing settings used by the first group of acquisition and tracking functions to track the multiple downconverted signals that are based on authentic GNSS signals and not on timing settings used to track the multiple downconverted signals that are based on spoofed GNSS signals.

One embodiment includes an apparatus including a first global positioning system (GPS) receiver for providing anti-spoofing capability to a second GPS receiver, wherein the apparatus includes: a first group of acquisition and tracking functions configured to acquire and track multiple downconverted signals, wherein an acquisition and tracking function includes a hardware correlator; a processor configured to determine which of the multiple downconverted signals are based on authentic GPS signals and which of the multiple downconverted signals are based on spoofed GPS signals; and a means for generating replicas of authentic GPS signals based on timing settings used by the first group of acquisition and tracking functions to track the multiple downconverted signals that are based on authentic GPS signals and not on timing settings used to track the multiple downconverted signals that are based on spoofed GPS signals.

One embodiment includes an apparatus including a global navigation satellite system (GNSS) receiver with anti-spoofing capability, wherein the apparatus includes: a beamformer having an output with a group of downconverted signals corresponding to a spot beam antenna pattern; a group of acquisition and tracking functions configured to acquire and track multiple downconverted signals, wherein an acquisition and tracking function includes a hardware correlator; and a processor configured to determine which of the multiple downconverted signals are based on authentic GNSS signals and which of the multiple downconverted signals are based on spoofed GNSS signals, wherein the processor is configured to determine that a downconverted signal is from an authentic space vehicle when a spot beam antenna pattern nominally pointed towards a location in space of a corresponding space vehicle is dithered and a signal strength of the downconverted signal varies in an expected manner with dithering of the spot beam antenna pattern, wherein the processor is further configured to determine position based on the multiple downconverted signals that are based on the authentic GNSS signals and not on the multiple downconverted signals that are based on spoofed GNSS signals.

One embodiment includes a method for providing a global navigation satellite system (GNSS) receiver with anti-spoofing capability, wherein the method includes: using a beamformer, generating an output with a group of downconverted signals corresponding to a spot beam antenna pattern; acquiring and tracking multiple downconverted signals using the group of acquisition and tracking functions, wherein an acquisition and tracking function includes a hardware correlator; determining which of the multiple downconverted signals are based on authentic GNSS signals and which of the multiple downconverted signals are based on spoofed GNSS signals, wherein a downconverted signal is determined to be based on a signal from an authentic space vehicle when a spot beam antenna pattern nominally pointed towards a location in space of a corresponding space vehicle is dithered and a signal strength of the downconverted signal varies in an expected manner with dithering of the spot beam antenna pattern; and determining position based on the multiple downconverted signals that are based on the authentic GNSS signals and not on the multiple downconverted signals that are based on spoofed GNSS signals.

BRIEF DESCRIPTION OF THE DRAWINGS

These drawings and the associated description herein are provided to illustrate specific embodiments of the invention and are not intended to be limiting.

To avoid repetition of description, components having the same or similar function may be referenced by the same reference number.

DETAILED DESCRIPTION OF SPECIFIC EMBODIMENTS

Figure 1:
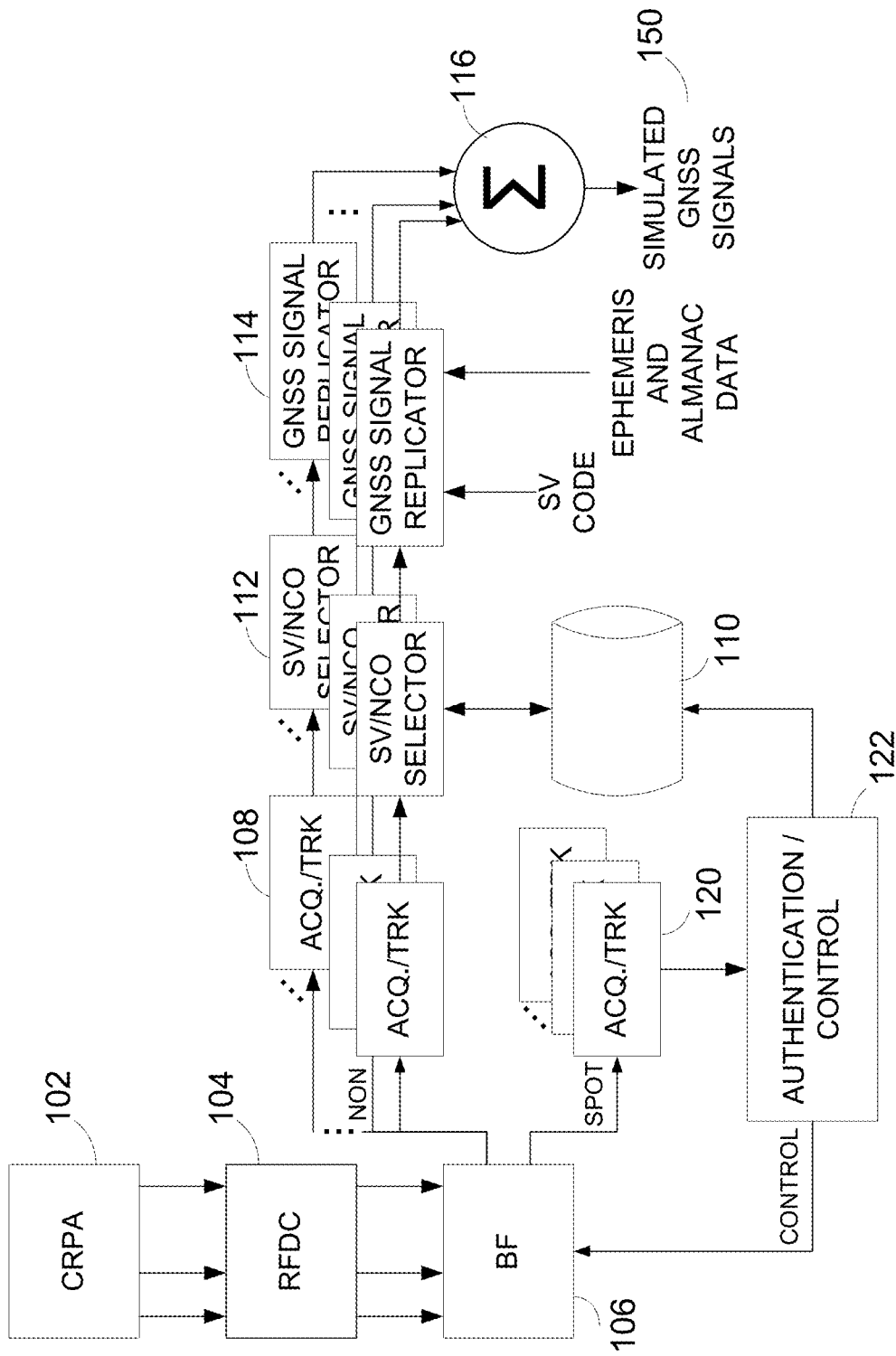
FIG. 1 illustrates an embodiment of an antenna and a GNSS receiver that can provide anti-spoofing capability to a second GNSS receiver via simulated GNSS signals. A beamformer provides a non-directional pattern output and a spot beam antenna pattern output.

Although particular embodiments are described herein, other embodiments, including embodiments that do not provide all of the benefits and features set forth herein, will be apparent to those of ordinary skill in the art.

Accurate reporting of position, velocity, and time are indeed desirable attributes of any GNSS receiver. While illustrated in the context of the NAVSTAR Global Positioning System (GPS), the principles and advantages described herein are applicable to other GNSS, such as, but not limited to, the Russian GLONASS system, the European Galileo system, the Chinese COMPASS system, the Indian IRNSS system, or the like.

GNSS receivers include, but are not limited to, navigation systems, surveying and mapping equipment, flight data recorders and other vehicle tracking equipment, Aircraft Communications Addressing and Reporting System (ACARS), and the like. Various types of objects can rely on the GNSS-based information. These objects can include, but are not limited to smart phones, cars, trucks, aircraft, gliders, helicopters, watercraft, driverless or autonomous motor vehicles, unmanned aerial vehicles (UAVs), guided missiles, cruise missiles, smart bombs, artillery, robots, farm equipment, network equipment, decoys, transponders, and the like. If a GNSS receiver for these objects were to incorrectly report information, undesirable events can occur to the object relying on the GNSS-based information, such as getting lost or thrown off course, incorrectly fertilizing a field, getting into accidents or crashes, incorrectly reporting position, velocity, and/or time in log entries, incorrectly synchronizing transmission of data, incorrectly mapping a region, or the like.

One embodiment of the invention can advantageously provide one or more countermeasures against spoofers. One embodiment identifies a direction from which a spoofing attack occurs. A beamformer can control an antenna pattern of a controlled reception pattern antenna (CRPA) to generate a variety of antenna patterns, such as directional patterns with a main lobe and/or to generate one or more nulls for a pattern that may or may not be directional. For example, a variety of different antenna patterns can be selected for beam steering or for null steering. These different antenna patterns can vary by, for example, applying different phase shifts for the signals from the elements of the CRPA. Parameters for antenna patterns, such as phase shift information, can be generated during a calibration operation and can be stored in lookup tables for access during operation and can also be generated during use using space-time adaptive processing (STAP) and/or space-frequency adaptive processing (SFAP).

With digital beamforming, many different antenna patterns can be generated at the same time. The different antenna patterns are generated via different patterns of constructive and destructive interference. When a directional antenna pattern is generated by the beamformer, the antenna pattern exhibits gain along the direction of the main lobe. A beam can be steered by changing the antenna pattern to one that has the main lobe along a different direction. When a null is generated by the beamformer, the antenna pattern exhibits attenuation or loss along the direction of the null. The nulls can also be steered by changing the antenna pattern from among various antenna patterns having nulls.

FIG. 1 illustrates an embodiment of an antenna 102 and components of a first GNSS receiver that can provide anti-spoofing capability to a second GNSS receiver via simulated GNSS signals 150. The second GNSS receiver can be a legacy GNSS receiver that does not inherently possess anti-spoofing capability. In certain embodiments, such as when the first GNSS receiver is only being use to provide anti-spoofing capability to the second GNSS receiver, the first GNSS receiver does not have to be a complete GNSS receiver and for example, does not need to provide a GNSS-based position, velocity, and time (PVT) solution as the PVT solution will be performed by the second GNSS receiver. However, for a standalone GNSS receiver, the capability to provide PVT can be readily added by those of ordinary skill in the art.

The antenna 102 can correspond to a controlled reception pattern antenna (CRPA). An RFDC block 104 of the illustrated GNSS receiver can include, for example, low noise amplifiers (LNAs), radio frequency (RF) downconverters, and analog-to-digital converters (ADCs). RF signals from each antenna element of the antenna 102 are amplified and downconverted by the LNAs and downconverters to generate intermediate frequency (IF) signals. The IF signals are then converted to digital form by the ADCs to generate digital IF signals. In the context of military GPS receivers utilizing both L1 and L2 bands, a digital IF signal downconverted from L1 and a digital IF signal downconverted from L2 can be generated for each antenna element. In the context of GPS, since the various signals from the various space vehicles (SVs) are broadcast at the same frequencies, these digital IF signals typically carry multiple digital downconverted signals. An advantage of using digital IF signals is that multiple independent antenna patterns/beams can be formed by a beamformer (BF) 106 from the signals originating from the antenna 102.

In the embodiment illustrated in FIG. 1, the beamformer 106 provides a non-directional pattern output and a spot beam antenna pattern output. In this example, the multiple downconverted signals from the non-directional pattern output are used for providing GNSS signal replication. The multiple downconverted signals from the spot beam antenna pattern output are used for identifying which of the multiple downconverted signals are based on authentic SV signals and which are based on spoofed signals.

In the context of GPS, the SVs broadcast their signals at the same frequencies. While these frequencies will be altered a bit by Doppler shift, multiple downconverted signals from multiple SV RF signals and possibly RF signals from spoofers can exist when received. Different SVs modulate their RF signals using different spreading codes or pseudo-random noise (PRN) codes such that a GPS receiver can distinguish among the signals. However, a spoofer will broadcast its signals using the same spreading codes as the SVs. A meaconer type of spoofer can take authentic signals from SVs and rebroadcast them with delays. It can be difficult for a conventional GPS receiver to distinguish between authentic and spoofed signals, which can lead to undesirable results, such as miscalculations of position.

The multiple downconverted signals from the non-directional pattern output are provided as an input to multiple acquisition and tracking functions 108. These acquisition and tracking functions 108 should be numerous enough to acquire and track both downconverted signals based on authentic RF SV signals and acquire and track downconverted signals based on spoofed RF signals. Acquisition and tracking of PRN codes is well known in the art and involves synchronizing a replica code for a SV with the signal (or downconverted version of the signal) received. After a signal is acquired and is being tracked, the timing required for synchronization with the replica code will be known. This timing information, which can be numerically-controlled oscillator (NCO) timing, can be the basis for reconstruction of a clean version of the GNSS signals, that is, a version without spoofing. These acquisition and tracking functions can include a combination of hardware and software. An example of hardware can include a correlator circuit, which is also known as a digital matched filter. Much of the control function, however, is typically implemented using firmware/ software instructions executed by a processor.

Using techniques to be described later, the acquired and tracked downconverted signals are characterized as being authentic or spoofed. For example, NCO timing and the characterization can be stored in a memory device 110. A selector 112, which can be implemented by software, can pass identifiers for the relevant replica codes and the corresponding NCO timings to GNSS signal replicators 114 for only the authenticated signals. The GNSS signal replicators can modulate the SV replica code, such as coarse acquisition (C/A) codes and precise P(Y) codes onto an RF carrier, such as via binary phase-shift keying (BPSK) modulation. Other codes, such as military (M) codes exist and will also be applicable. The almanac data and the relevant ephemeris data for the SV can also be included in the modulation. This can be performed in a similar manner as is actually done in a SV. Other techniques can apply. The ephemeris data and almanac data can be retrieved from the authentic GNSS signals via the navigation message or can be retrieved from a different source, such as a computer network. The various modulated RF signals are then combined 116 and can be provided as an input to the second GNSS receiver to provide the second GNSS receiver with anti-spoofing capability. The RF combining technique is not critical as the RF signal power can be relatively low. A process for generating simulated or replica GNSS signals will be described later in connection with FIG. 7.

In the embodiment illustrated in FIG. 1, the multiple downconverted signals from the spot beam antenna pattern output of the beamformer 106 are provided as an input to multiple acquisition and tracking functions 120. The spot beam antenna pattern is used for identifying which of the multiple downconverted signals are based on authentic SV signals and which are based on spoofed signals. One technique to detect spoofers is described in copending and co-owned U.S. patent application Ser. No. 14/678,755, filed on Apr. 3, 2015. Another technique will be described in greater detail later in connection with FIG. 8. Other techniques may also be applicable. The characterization of signals as being based on authentic signals or spoofed signals can be repeatedly performed to maintain updated anti-spoofing. The authentication/control block 122 can perform the particular spoofing detection technique and provide the results to the memory device 110.

Figure 2:
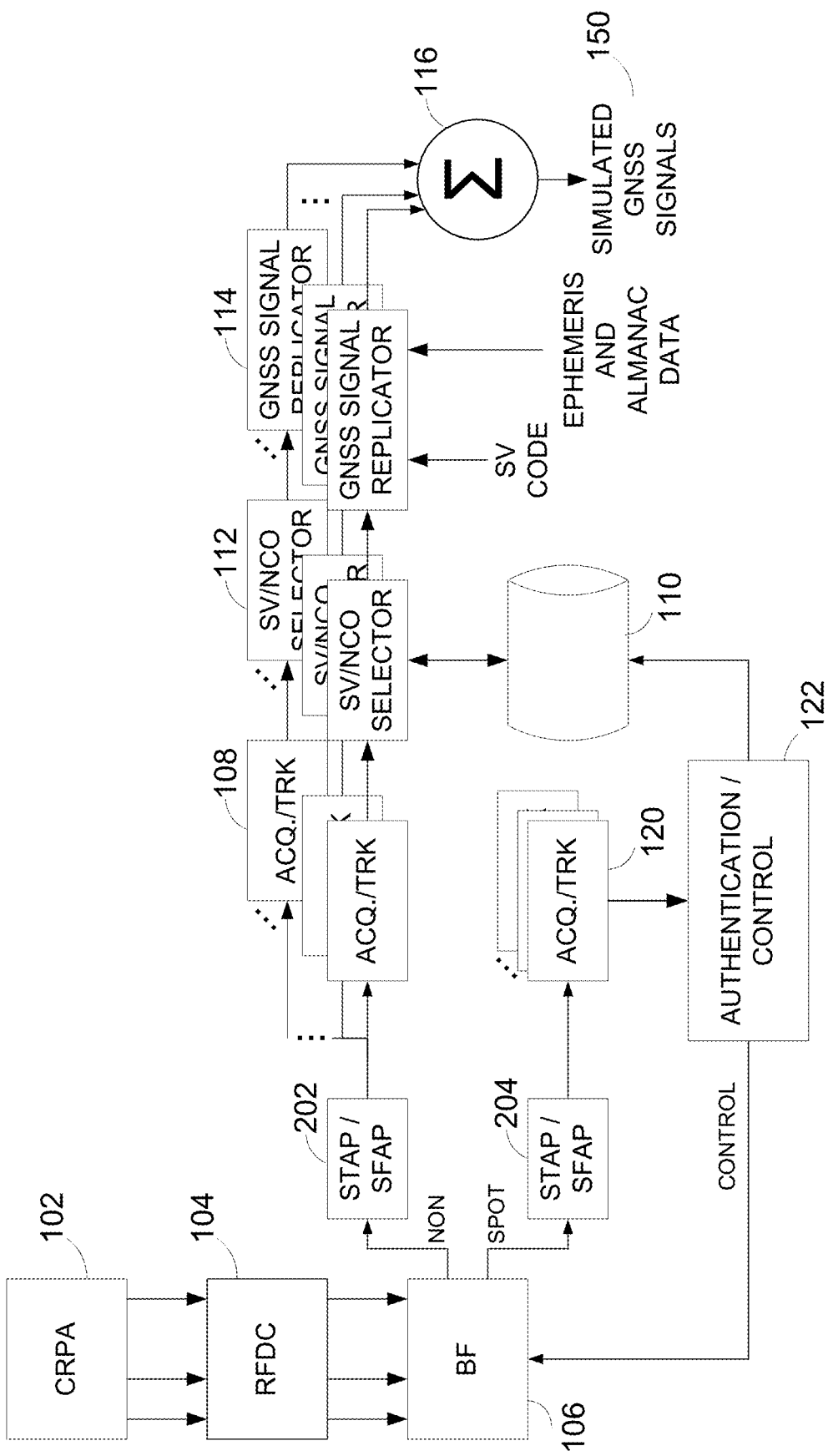
FIG. 2 illustrates the embodiment of FIG. 1 with the addition of anti-jamming processing.

FIG. 2 illustrates the embodiment of FIG. 1 with the addition of anti-jamming processing. For example, space-time adaptive processing (STAP) or space-frequency adaptive processing (SFAP) techniques can be used to provide anti-jam capability. As illustrated in FIG. 2, a first STAP or SFAP processor 202 is disposed in a signal path between the non-directional antenna pattern output of the beamformer 106 and an input of the group of acquisition and tracking functions 108, and a second STAP or SFAP processor is disposed in a signal path between the spot beam antenna pattern output of the beamformer 106 and an input of the group of acquisition and tracking functions 120.

Figure 3:
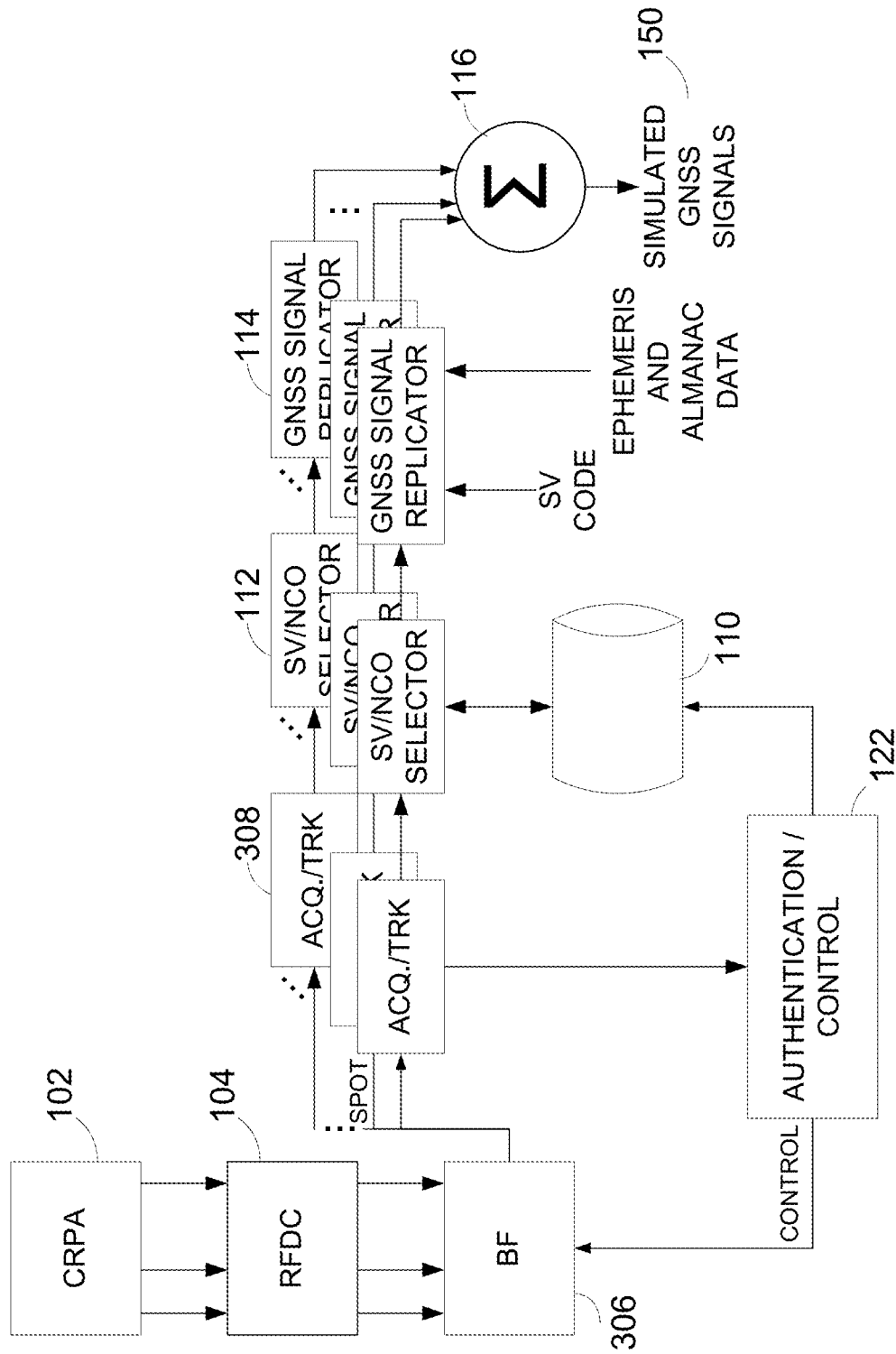
FIG. 3 illustrates an embodiment of an antenna and a GNSS receiver that can provide anti-spoofing capability to a second GNSS receiver via simulated GNSS signals. A beamformer provides a spot beam antenna pattern output.

FIG. 3 illustrates an embodiment of an antenna 102 and a GNSS receiver that can provide anti-spoofing capability to a second GNSS receiver via simulated GNSS signals. To avoid repetition of description with that of FIG. 1, components having the same or similar function may be referenced by the same reference number.

Unlike the embodiment of FIG. 1, the beamformer 306 does not have a non-directional antenna pattern output. The beamformer 306 provides a spot beam antenna pattern output. The spot beam antenna pattern output is provided as an input to multiple acquisition and tracking functions 308. The spot beam antenna pattern output is used for both reconstruction of a clean GNSS signal and for distinguishing authentic signals from spoofed signals. As will be explained in greater detail later in connection with FIG. 8, the spot beam can be pointed at particular locations in space where the SVs are supposed to be in order to distinguish between authentic and spoofed signals. While the spot beam may not be pointed towards other SVs, there should be enough energy received to maintain acquisition and tracking with the other SV signals.

Figure 4:
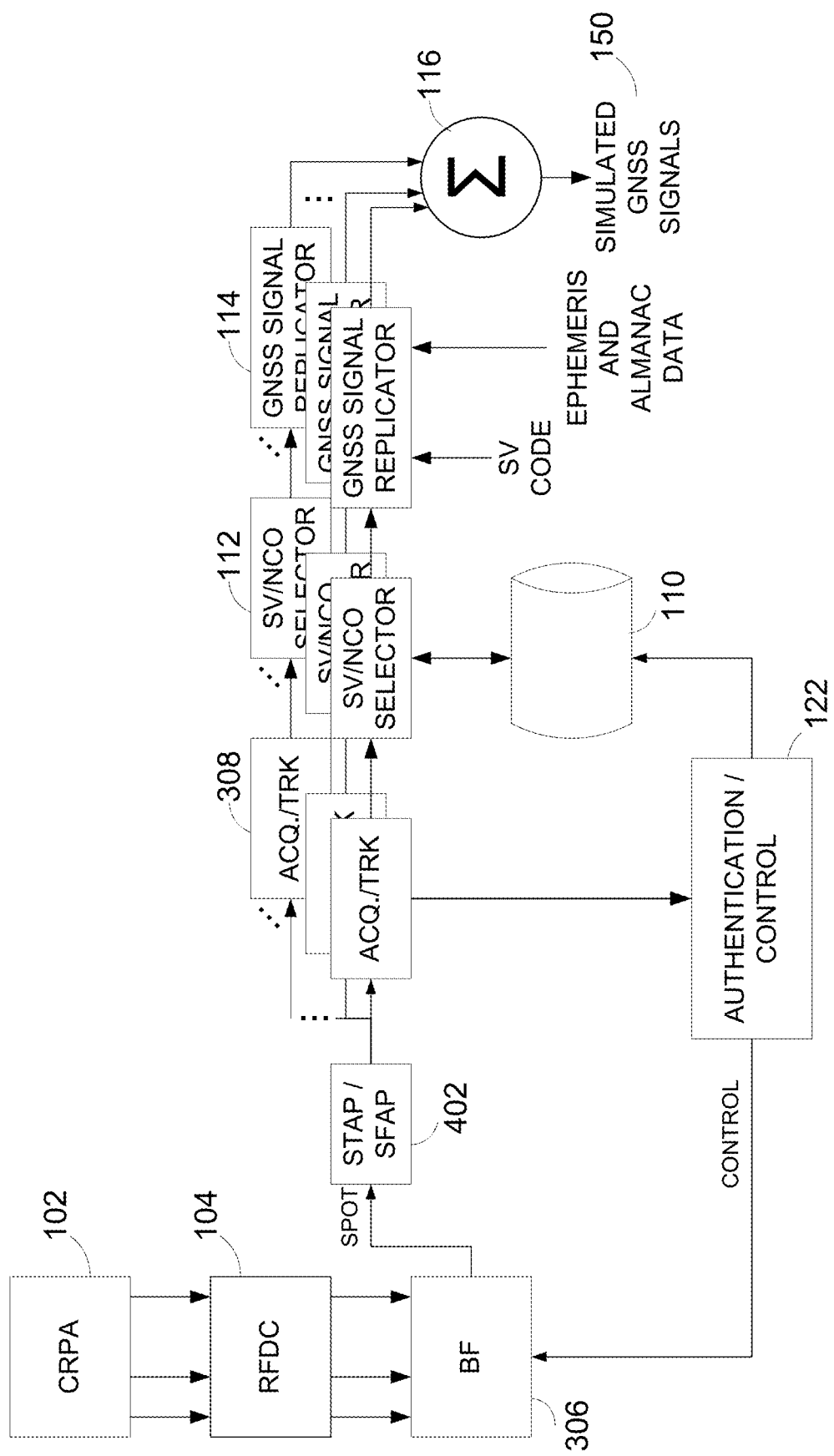
FIG. 4 illustrates the embodiment of FIG. 3 with the addition of anti-jamming processing.

FIG. 4 illustrates the embodiment of FIG. 3 with the addition of anti-jamming processing. As illustrated in FIG. 4, a STAP or SFAP processor 402 is disposed in a signal path between the spot beam antenna pattern output of the beamformer 306 and an input of the group of acquisition and tracking functions 308.

Figure 5:
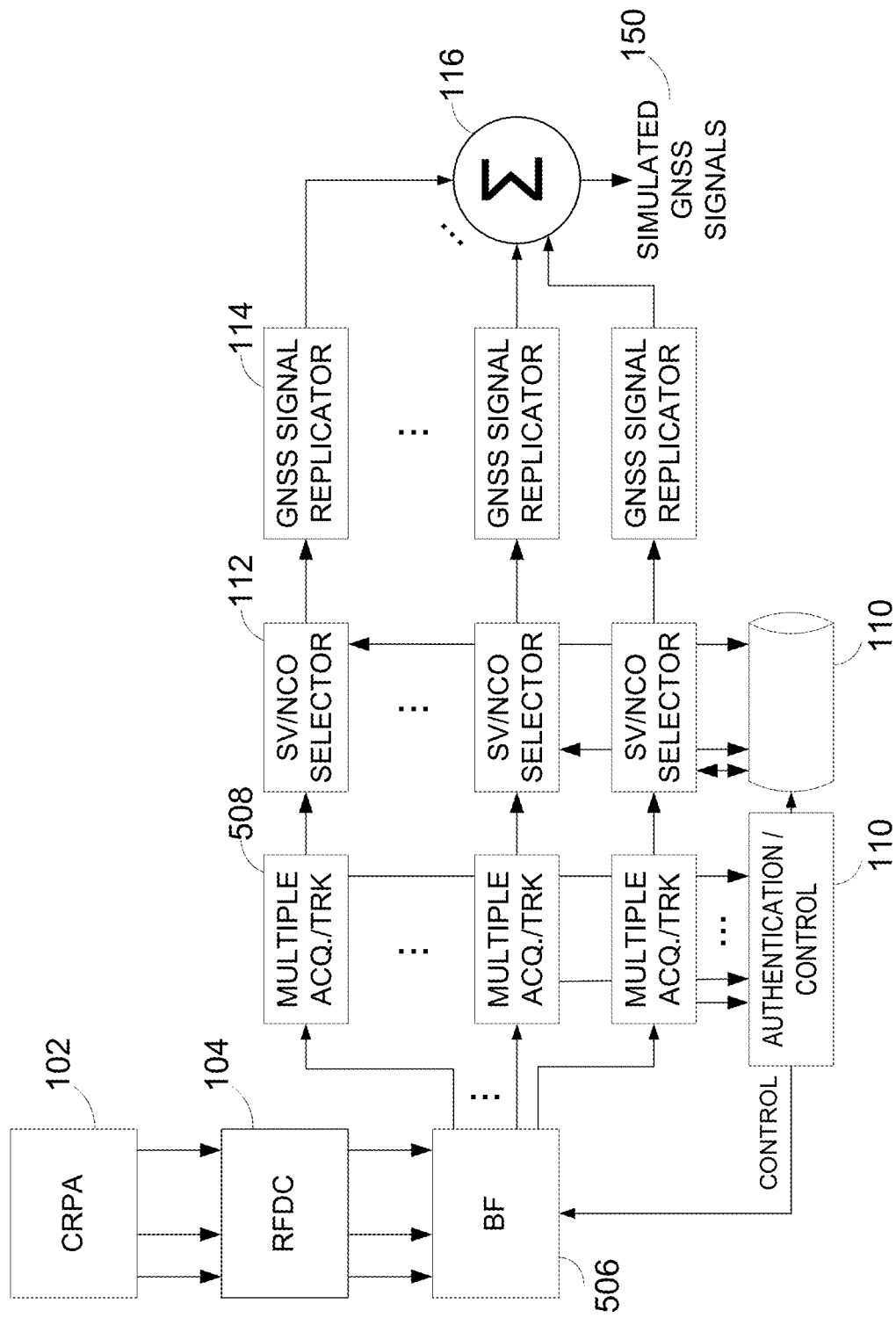
FIG. 5 illustrates an embodiment of an antenna and a GNSS receiver that can provide anti-spoofing capability to a second GNSS receiver via simulated GNSS signals. A beamformer provides multiple spot beam antenna pattern outputs.

FIG. 5 illustrates an embodiment of an antenna 102 and a GNSS receiver that can provide anti-spoofing capability to a second GNSS receiver via simulated GNSS signals. In the embodiment of FIG. 5, the beamformer 506 generates multiple spot beam antenna patterns. These multiple spot beam antenna patterns can advantageously provide gain in the direction of the SVs to provide additional anti-spoofing and anti-jamming capability over the embodiment described in connection with FIG. 3.

Figure 6:
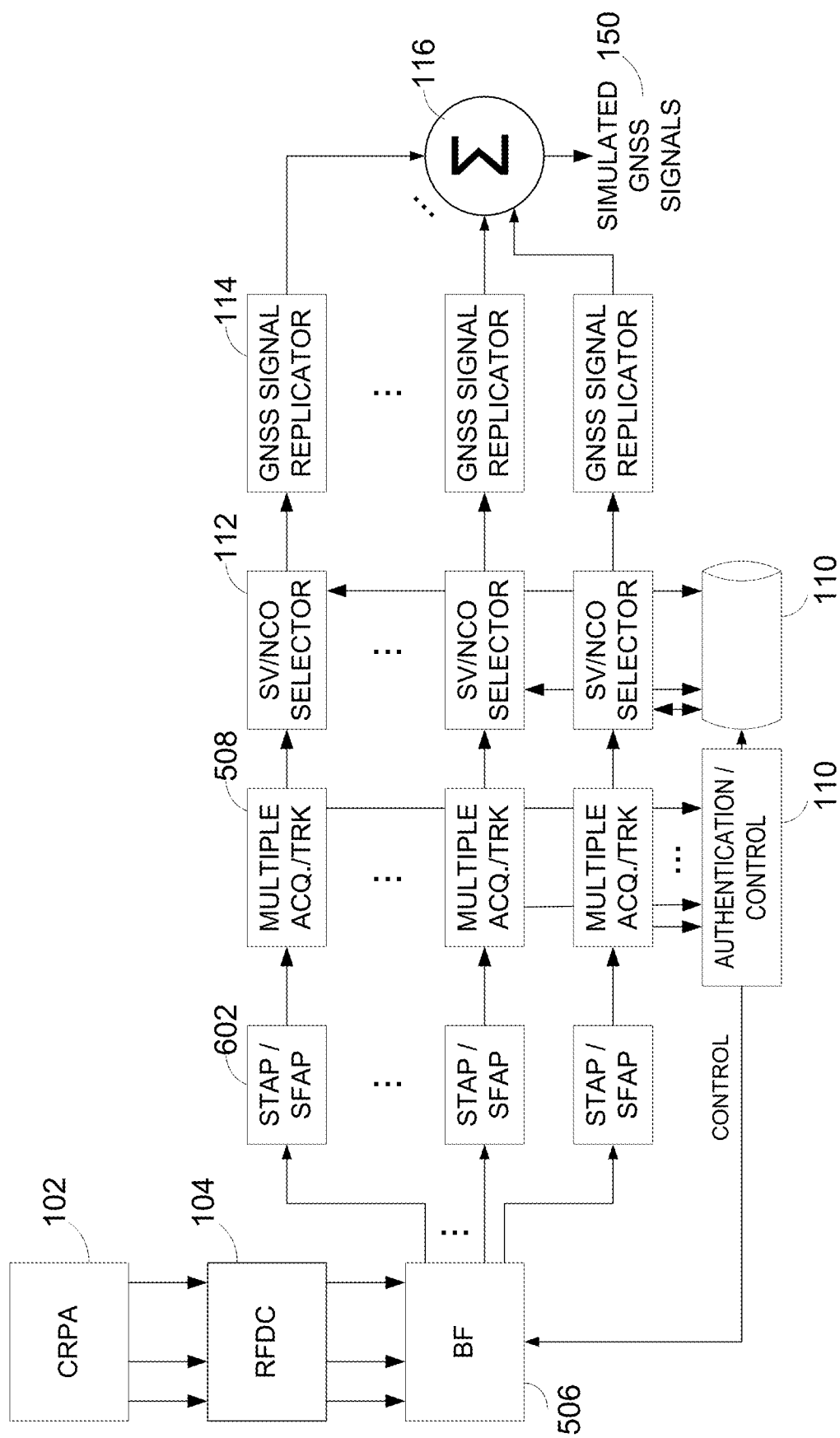
FIG. 6 illustrates the embodiment of FIG. 5 with the addition of anti-jamming processing.

FIG. 6 illustrates the embodiment of FIG. 5 with the addition of anti-jamming processing. As illustrated in FIG. 6, STAP or SFAP processors 602 are disposed in signal paths between the various spot beam antenna pattern outputs of the beamformer 306 and inputs of the groups of acquisition and tracking functions 508.

Figure 7:
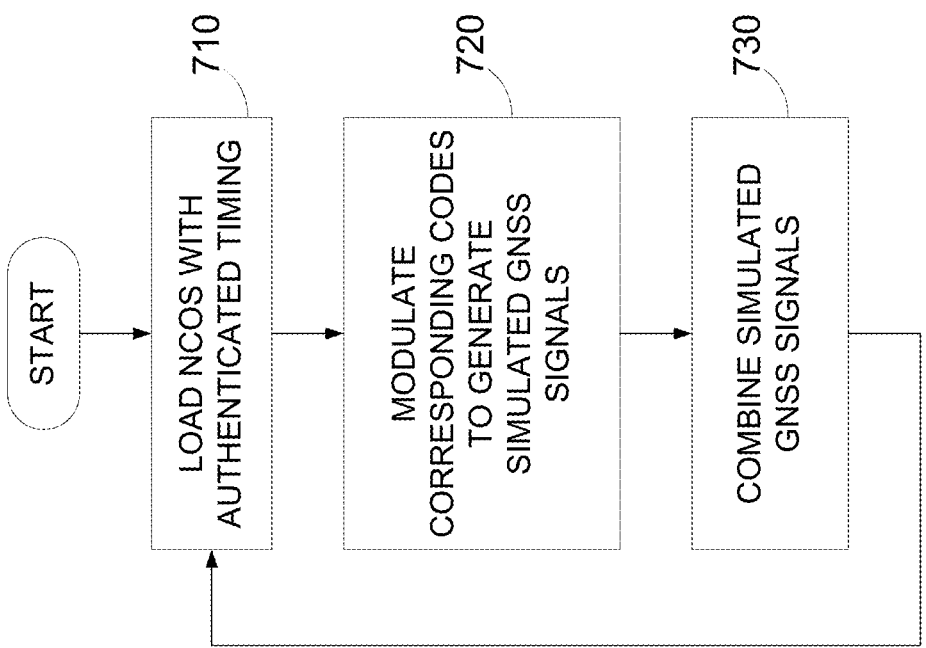
FIG. 7 illustrates a process for generating simulated or replica GNSS signals.

FIG. 7 illustrates a process for generating simulated or replica GNSS signals. After the authenticated signals are identified, the timing information from these signals, such as NCO timing, is used to reconstruct clean GNSS replica signals. In a state 710, the NCOs that control the timing of code chips for SV PRN codes are loaded with the timing information from the authentic GNSS signals. In a state 720, these codes, such as, but not limited to, C/A codes and P(Y) codes, are modulated onto RF carriers to generate simulated GNSS signals. In a state 730, the various simulated GNSS signal are combined. The process can be repeated as desired. The second GNSS receiver can advantageously receive this clean GNSS replica signal and accurately provide PVT information even in the presence of spoofers.

Figure 8:
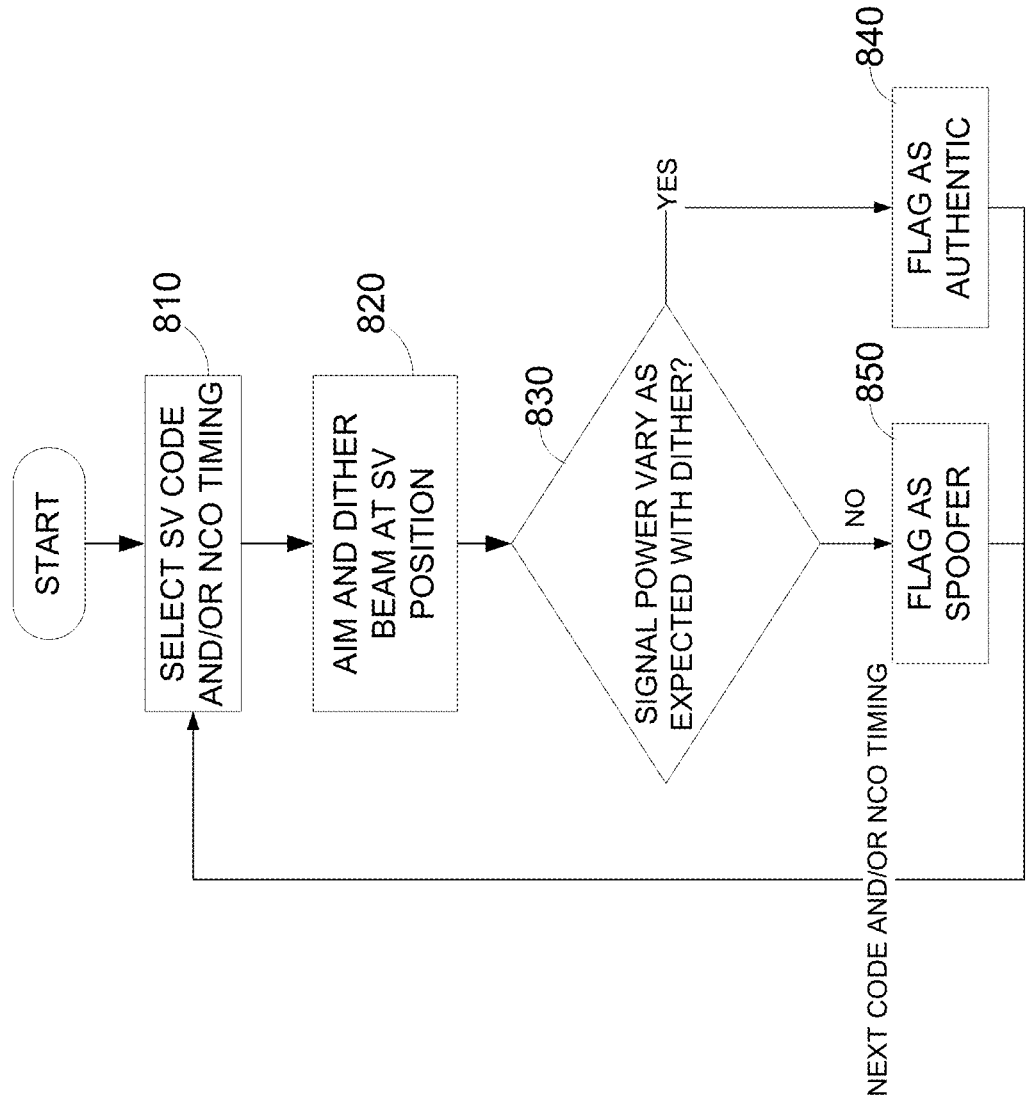
FIG. 8 illustrates a process for determining whether a signal originated from an authentic space vehicle source or originated from a spoofer.

FIG. 8 illustrates a process for determining whether a signal originated from an authentic space vehicle source or originated from a spoofer. While illustrated sequentially, the process can alternatively be performed in parallel for multiple signals from multiple SVs. The process begins with a selection of a particular SV code 810 with a particular timing. As described earlier, in the presence of a spoofer, multiple signals having the same SV code can be present. A spot beam from the beamformer is aimed or pointed towards a point in space where the particular SV is supposed to be. The location of a particular SV can be obtained from its ephemeris data. The aiming of the spot beam is then dithered 810 or moved around that point in space, and the signal power is monitored to see if it varies as expected 830. An authentic signal from a space vehicle will vary in power, such as carrier-to-noise ratio, as the spot beam is dithered. This variance can vary in a broad range based on beam width, the number of elements in the CRPA, etc. However, the expected amount of variance will be readily determined by one of ordinary skill in the art. By contrast, the signal from a spoofer on the ground will not vary as much as the beam is dithered.

If the signal power varies as expected, the process determines that the signal is authentic and can flag that signal as authentic. If the signal power does not vary as expected, the process determines that the signal originates from a spoofer and can flag that signal as spoofed or untrustworthy. These determination can be used in reconstructing clean replica signals for a second GNSS receiver or for providing anti-spoofing capability in a standalone GNSS receiver. The process can be repeated for other signals of the same code but with different NCO timings and/or for other codes. These techniques can be implemented by execution of software modules by a computer hardware system. Instructions for the software can be stored in a tangible, computer-readable medium.

Figure 10:
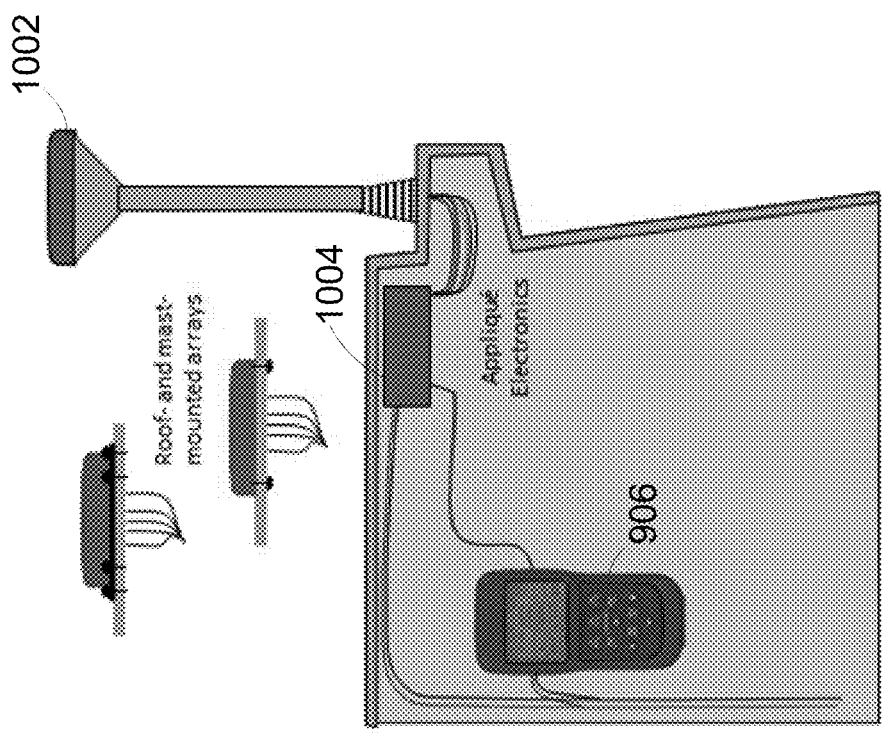
FIG. 10 illustrates a separate antenna and GNSS receiver.
Figure 9:
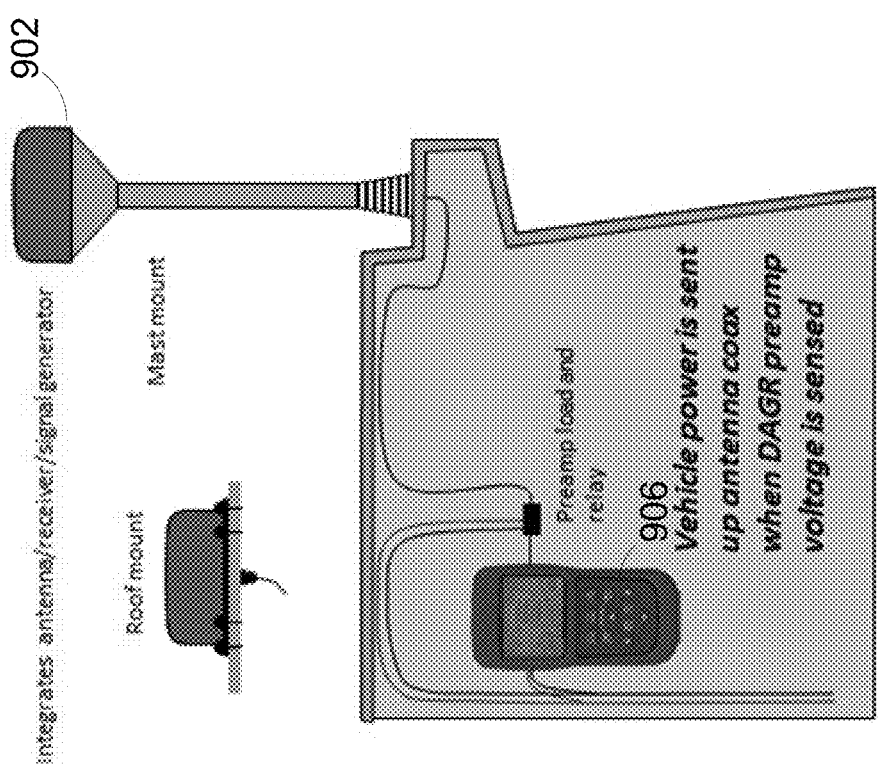
FIG. 9 illustrates an integrated antenna and GNSS receiver.

FIG. 9 illustrates an integrated antenna and GNSS receiver 902. FIG. 10 illustrates a separate antenna 1002 and GNSS receiver 1004. The clean simulated GNSS replica signals can be provided to the second GNSS receiver 906.

Figure 11:
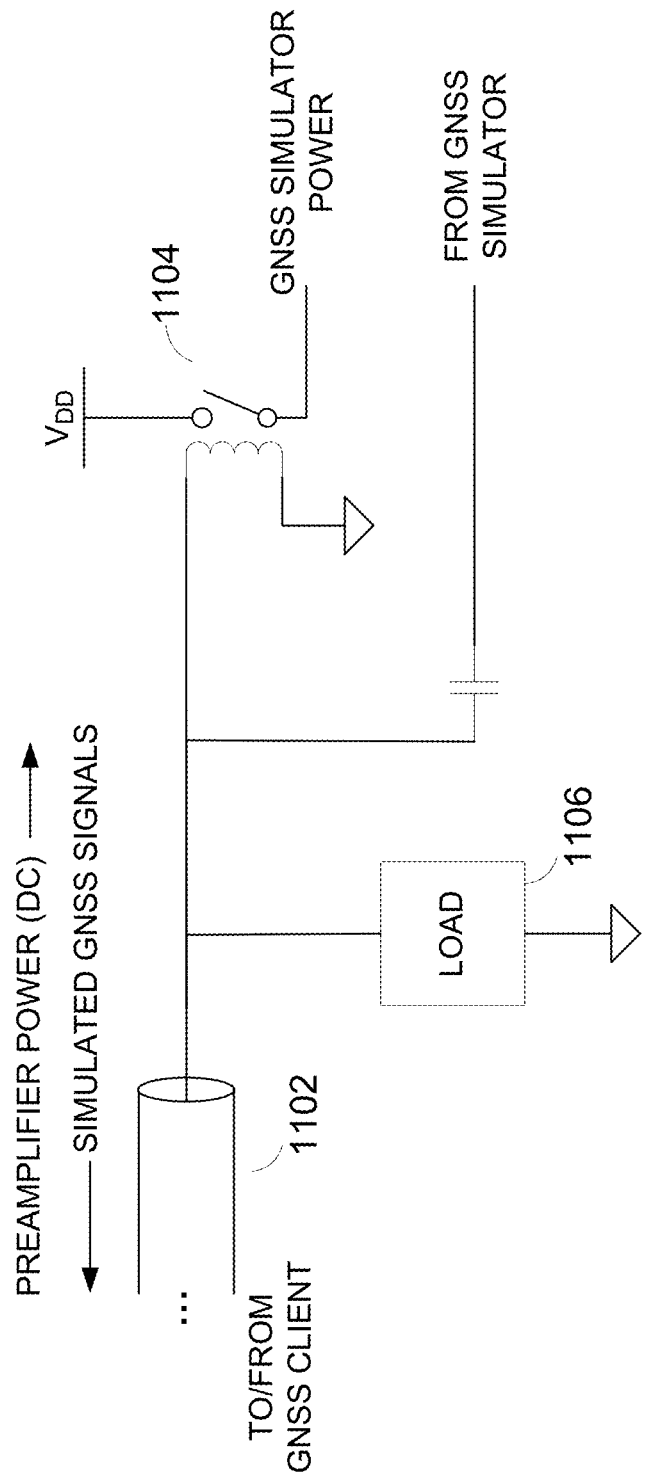
FIG. 11 illustrates an embodiment of an adapter for powering a GNSS receiver with anti-spoofing and providing simulated GNSS signals to a second GNSS receiver.

FIG. 11 illustrates an embodiment of an adapter for powering a GNSS receiver with anti-spoofing and providing simulated GNSS signals to a second GNSS receiver. An antenna input port 1102 for the second GNSS receiver 906 can be used for both receiving GNSS signals and for providing preamplifier power. Of course, the simulated GNSS signals can be provided to the second GNSS receiver 906 via the antenna input port, but the preamplifier output can also be used to power a relay 1104 for powering of the GNSS receiver with anti-spoofing, as the power intended for a preamplifier can be insufficient to power up a GNSS receiver. A load 1106 can be provided for RF matching. A capacitor 1108 can be used to isolate DC power and RF signals.

Figure 12:
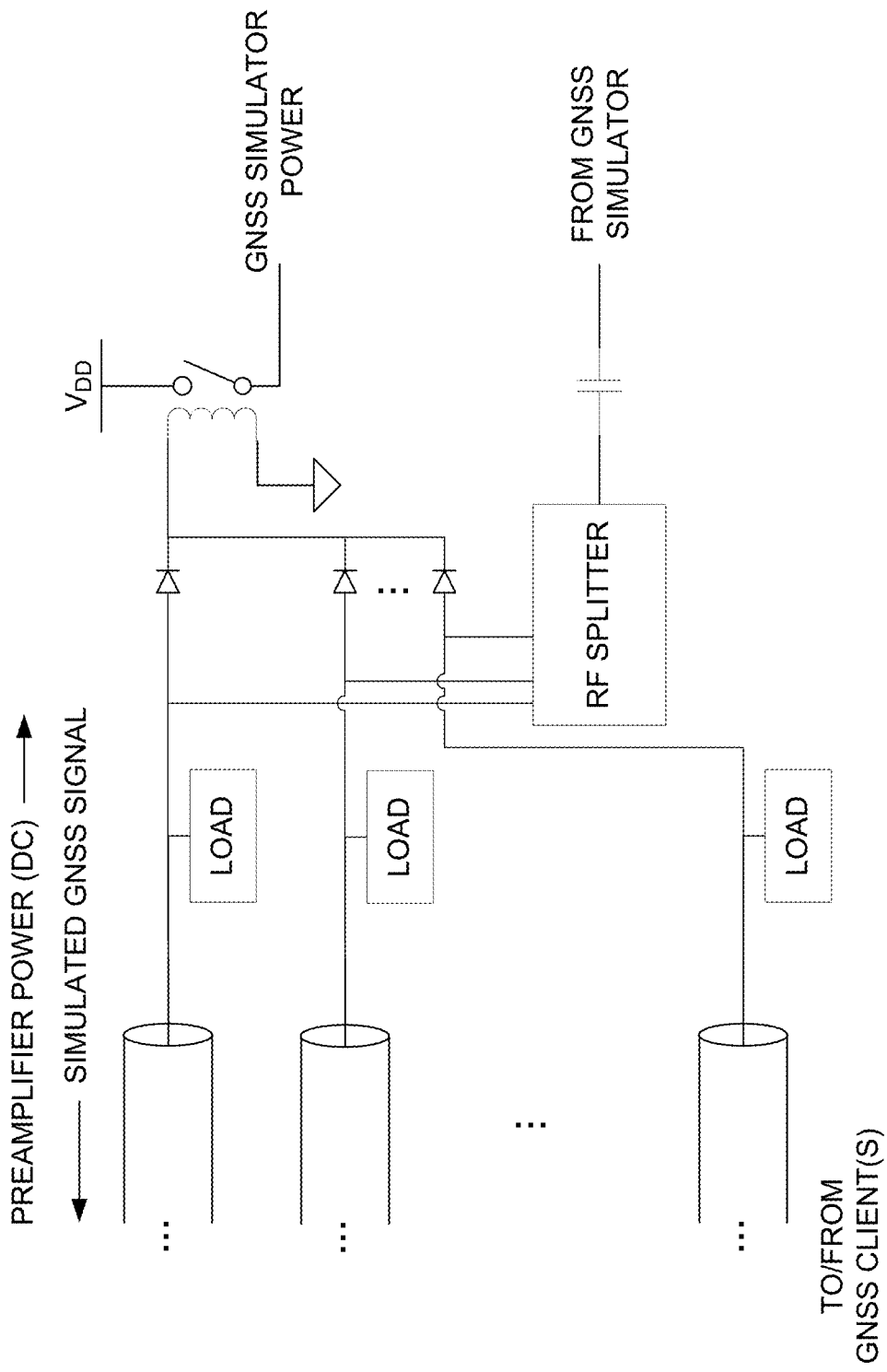
FIG. 12 illustrates an embodiment configured to provide simulated GNSS signals to multiple GNSS receivers.

FIG. 12 illustrates an embodiment of an adapter for powering multiple GNSS receivers with anti-spoofing and providing simulated GNSS signals to multiple GNSS receivers. Antenna input ports for the GNSS receivers can be used for both receiving GNSS signals and for providing preamplifier power. The simulated GNSS signals can be provided to a given GNSS receiver via a respective antenna input port, and optionally the preamplifier output can also be used to power a relay for powering of the given GNSS receiver with anti-spoofing. A load can be provided for each antenna input port for RF matching. Each antenna input port may be connected to an RF splitter so that the signal from the GNSS simulator may be shared by the multiple GNSS receivers. A capacitor can be used to isolate DC power and RF signals.

Various embodiments have been described above. Although described with reference to these specific embodiments, the descriptions are intended to be illustrative and are not intended to be limiting.

What is claimed is:

1. An apparatus comprising a first global navigation satellite system (GNSS) receiver configured to provide anti-spoofing capability to a second GNSS receiver, the apparatus comprising:
an acquisition and tracking circuit comprising at least a matched filter, the acquisition and tracking circuit configured to track a plurality downconverted signals;
a processor configured to determine which of the plurality of downconverted signals are based on authentic GNSS signals and which of the plurality of downconverted signals are based on spoofed GNSS signals;
a beamformer at least partially controlled by the processor, wherein the beamformer has at least a first output with a first group of signals and a second output with a second group of signals, wherein the first output corresponds to a non-directional antenna pattern and the second output corresponds to a spot beam antenna pattern, wherein the first group of signals is provided as an input to the acquisition and tracking circuit; and wherein the processor is configured to determine whether a particular downconverted signal is based on an authentic GNSS signal or on a spoofed GNSS signal.

2. The apparatus of claim 1, the apparatus further comprising GNSS signal replicators configured to generate replicas of authentic GNSS signals based on timing settings used to track the plurality of downconverted signals that are based on authentic GNSS signals, wherein the timing settings comprise numerically controlled oscillator (NCO) settings.

3. The apparatus of claim 1, wherein the GNSS comprises a global positioning system (GPS), wherein the plurality of downconverted signals comprise at least a first downconverted authentic signal and a second downconverted spoofed signal, wherein both the first downconverted authentic signal and the second downconverted spoofed signal share a same space vehicle (SV) pseudo-random noise (PRN) code, but have different timing offsets and are both independently tracked by the acquisition and tracking circuit.

4. The apparatus of claim 1, wherein the apparatus is configured to determine that a given downconverted signal is from an authentic space vehicle at least partly in response to determining, when a spot beam antenna pattern nominally pointed towards a location in space of a corresponding space vehicle is dithered, that a signal strength of the given downconverted signal varies in an expected manner with dithering of the spot beam antenna pattern.

5. The apparatus of claim 1, the apparatus further comprising:
a first anti-jam processor disposed in a first signal path between the first output of the beamformer and an input of the acquisition and tracking circuit; and
a second anti-jam processor disposed in a second signal path between the second output of the beamformer and an input of a second acquisition and tracking circuit, the second acquisition and tracking circuit used by the processor in determining whether a particular downconverted signal is based on an authentic GNSS signal or on a spoofed GNSS signal.

6. An apparatus comprising a first global navigation satellite system (GNSS) receiver, the apparatus comprising:
a first acquisition and tracking circuit comprising at least a matched filter,
the acquisition and tracking circuit configured to track a plurality downconverted signals;
a processor configured to determine:
which of the plurality of downconverted signals are based on authentic GNSS signals, and
which of the plurality of downconverted signals are based on spoofed GNSS signals;
a beamformer at least partially controlled by the processor, wherein the beamformer is configured to generate a plurality spot beam antenna patterns; and
at least a second acquisition and tracking circuit configured to receive one or more groups of signals corresponding to the plurality of spot beam antenna patterns; and
GNSS signal replicators configured to generate replicas of authentic GNSS signals using timing settings used by at least the first acquisition and tracking circuit and the second acquisition and tracking circuit.

7. The apparatus of claim 6, the apparatus further comprising a plurality of anti-jam processors disposed in respective signal paths between outputs of the beamformer and inputs of respective one acquisition and tracking circuits.

8. An apparatus comprising a first global navigation satellite system (GNSS) receiver, the apparatus comprising:
a first acquisition and tracking circuit comprising at least a matched filter, the acquisition and tracking circuit configured to track a plurality downconverted signals;
a processor configured to determine:
which of the plurality of downconverted signals are based on authentic GNSS signals, and
which of the plurality of downconverted signals are based on spoofed GNSS signals; and
a beamformer at least partially controlled by the processor, wherein the beamformer is configured to output a group of signals corresponding to a spot beam antenna pattern, wherein the group of signals is provided as an input to the first acquisition and tracking circuit; and
wherein the processor is configured to utilize the first acquisition and tracking circuit to determine whether a particular downconverted signal is based on an authentic GNSS signal or on a spoofed GNSS signal.

9. The apparatus of claim 8, wherein the apparatus is configured to determine that a given downconverted signal is from an authentic space vehicle at least partly in response to determining, when a spot beam antenna pattern nominally pointed towards a location in space of a corresponding space vehicle is dithered, that a signal strength of the given downconverted signal varies in an expected manner with dithering of the spot beam antenna pattern.

10. The apparatus of claim 8, the apparatus further comprising:
GNSS signal replicators configured to generate replicas of authentic GNSS signals based on timing settings used to track the plurality of downconverted signals that are based on authentic GNSS signals, wherein the timing settings comprise numerically controlled oscillator (NCO) settings; and
an anti-jam processor disposed in a signal path between the output of the beamformer and an input of the first acquisition and tracking circuit.

11. A method for providing anti-spoofing capability, the method comprising:
acquiring and tracking multiple downconverted signals using a first acquisition and tracking circuit;
determining:
which of the multiple downconverted signals are based on authentic GNSS signals, and
which of the multiple downconverted signals are based on spoofed GNSS signals;
using a beamformer, generating at least:
a first output with a first group of signals, and
a second output with a second group of signals,
wherein the first output corresponds to a non-directional antenna pattern and the second output corresponds to a spot beam antenna pattern, and
wherein the first group of signals is provided as an input to the first acquisition and tracking circuit; and
using at least a second acquisition and tracking circuit to determine whether a particular downconverted signal is based on an authentic GNSS signal or on a spoofed GNSS signal.

12. The method of claim 11, the method further comprising using one or more GNSS signal replicators to generate replicas of authentic GNSS signals using timing settings used by the first acquisition and tracking circuit to track the multiple downconverted signals that are based on authentic GNSS signals, wherein the timing settings comprise numerically controlled oscillator (NCO) settings.

13. The method of claim 11, the method further comprising:
providing anti-jam processing in a signal path between the first output of the beamformer and an input of the first acquisition and tracking circuit.

14. A method for providing anti-spoofing capability from a first global navigation satellite system (GNSS) receiver to a second GNSS receiver, the method comprising:
acquiring and tracking multiple downconverted signals using a first acquisition and tracking circuit;
determining:
which of the multiple downconverted signals are based on authentic GNSS signals, and
which of the multiple downconverted signals are based on spoofed GNSS signals;
wherein the GNSS comprises a global positioning system (GPS), and
wherein the multiple downconverted signals comprise at least a first downconverted authentic signal and a second downconverted spoofed signal,
independently tracking the first downconverted authentic signal and the second downconverted spoofed signal,
wherein the first downconverted authentic signal and the second downconverted spoofed signal share a same space vehicle (SV) pseudo-random noise (PRN) code, but have different timing offsets.

15. The method of claim 14, the method further comprising determining that a downconverted signal is from an authentic space vehicle at least partly in response to determining that a signal strength of the downconverted signal varies in an expected manner with dithering of a spot beam antenna pattern when a spot beam antenna pattern nominally pointed towards a location in space of a corresponding space vehicle is dithered.

16. The method of claim 14, the method further comprising:
using a beamformer, generating at least a first output with a first group of signals and a second output with a second group of signals, wherein the first output corresponds to a non-directional antenna pattern and the second output corresponds to a spot beam antenna pattern, wherein the first group of signals is provided as an input to the first acquisition and tracking circuit;
providing first anti-jam processing m a first signal path between the first output of the beamformer and an input of the first acquisition and tracking circuit.

17. A method for providing anti-spoofing capability from a first global navigation satellite system (GNSS) receiver to a second GNSS receiver, the method comprising:
acquiring and tracking multiple downconverted signals;
determining which of the multiple downconverted signals are based on authentic GNSS signals and which of the multiple downconverted signals are based on spoofed GNSS signals;
using a beamformer, generating multiple outputs corresponding to multiple spot beam antenna patterns;
receiving groups of signals corresponding to the multiple spot beam antenna patterns; and
generating replicas of authentic GNSS signals based on timing settings used to acquire and track the multiple downconverted signals.

18. The method of claim 17, the method further comprising performing anti-jam processing in signal paths between outputs of the beamformer and inputs of an acquisition and tracking circuit.

19. A method for providing anti-spoofing capability from a first global navigation satellite system (GNSS) receiver to a second GNSS receiver, the method comprising:
acquiring and tracking multiple downconverted signals;
determining which of the acquired multiple downconverted signals are based on authentic GNSS signals and which of the multiple downconverted signals are based on spoofed GNSS signals;
generating replicas of authentic GNSS signals based on timing settings used in acquiring and tracking the multiple downconverted signals that are based on authentic GNSS signals; and
using a beamformer, generating at least an output with a group of signals, wherein the output corresponds to a spot beam antenna pattern, wherein the group of signals is provided as an input to the first group of acquisition and tracking functions, wherein the first group of acquisition and tracking functions are used by the processor to determine whether a particular downconverted signal is based on an authentic GNSS signal or on a spoofed GNSS signal.

20. The method of claim 19, the method further comprising determining that a downconverted signal is from an authentic space vehicle at least partly in response to determining that a signal strength of the downconverted signal varies in an expected manner with dithering of a spot beam antenna pattern when the spot beam antenna pattern nominally pointed towards a location in space of a corresponding space vehicle is dithered.

21. The method of claim 19, the method further comprising performing anti-jam processing on a signal in a path from the output of the beamformer and an input of an acquisition and tracking circuit.

* * * * *

UNITED STATES PATENT AND TRADEMARK OFFICE
CERTIFICATE OF CORRECTION

PATENT NO. : 11,181,646 B2
APPLICATION NO. : 16/902858
DATED : November 23, 2021
INVENTOR(S) : Boyer et al.

Page 1 of 1

It is certified that error appears in the above-identified patent and that said Letters Patent is hereby corrected as shown below:

In the Specification

Column 4, Line 61, Delete "use" and insert -- used --.

In the Claims

Column 8, Line 58, In Claim 1, after "plurality" insert -- of --.

Column 9, Line 49, In Claim 6, after "plurality" insert -- of --.

Column 10, Line 7, In Claim 8, after "plurality" insert -- of --.

Column 11, Line 45 (approx.), In Claim 16, delete "m" and insert -- in --.

Signed and Sealed this
Twenty-fourth Day of May, 2022

Katherine Kelly Vidal
*Director of the United States Patent and Trademark Office*